United States Patent
Bartlett et al.

(10) Patent No.: US 8,031,391 B2
(45) Date of Patent: Oct. 4, 2011

(54) SYSTEM AND METHOD FOR OPERATING LIGHT PROCESSING ELECTRONIC DEVICES

(75) Inventors: Terry Alan Bartlett, Dallas, TX (US); James Anthony Strain, Allen, TX (US); Paul L. Rancuret, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 469 days.

(21) Appl. No.: 12/104,279

(22) Filed: Apr. 16, 2008

(65) Prior Publication Data

US 2009/0262413 A1 Oct. 22, 2009

(51) Int. Cl.
G02B 26/00 (2006.01)
G02B 26/08 (2006.01)
(52) U.S. Cl. ............ 359/291; 359/223.1; 359/237
(58) Field of Classification Search ........ 359/290–292, 359/295, 223–225, 245, 260–263, 298, 198, 359/301–303, 317–318, 237, 242
See application file for complete search history.

(56) References Cited

U.S. PATENT DOCUMENTS

| 5,482,564 | A | 1/1996 | Douglas et al. |
| 5,665,997 | A | 9/1997 | Weaver et al. |
| 5,774,254 | A * | 6/1998 | Berlin ............ 359/259 |
| 6,094,246 | A | 7/2000 | Wong et al. |
| 6,201,593 | B1 | 3/2001 | Wong et al. |
| 7,167,298 | B2 | 1/2007 | Pan |
| 2004/0147808 | A1 * | 7/2004 | MacAulay et al. ..... 600/160 |
| 2005/0200927 | A1 * | 9/2005 | Brotherton-Ratcliffe et al. ................ 359/21 |

* cited by examiner

*Primary Examiner* — Dawayne A Pinkney
(74) *Attorney, Agent, or Firm* — Charles A. Brill; Wade James Brady, III; Frederick J. Telecky, Jr.

(57) ABSTRACT

A system and method for operating an electronic device used in light processing. A method comprises altering a spatial relationship between a spatial light modulator (SLM) and a light incident on the SLM, shifting light modulator states of a first portion of light modulators to a second portion of light modulators, and placing a third portion of light modulators in the SLM into a performance degradation-reducing mode. The amount of shifting performed is proportional to the amount of change in the spatial relationship. The method allows for a change in light modulators used to modulate the light, thereby preventing the overuse of some of the light modulators, which may help to prevent degradation of the light modulators. The performance degradation reducing mode may help to further reduce or even reverse the performance degradation of the light modulators.

12 Claims, 7 Drawing Sheets

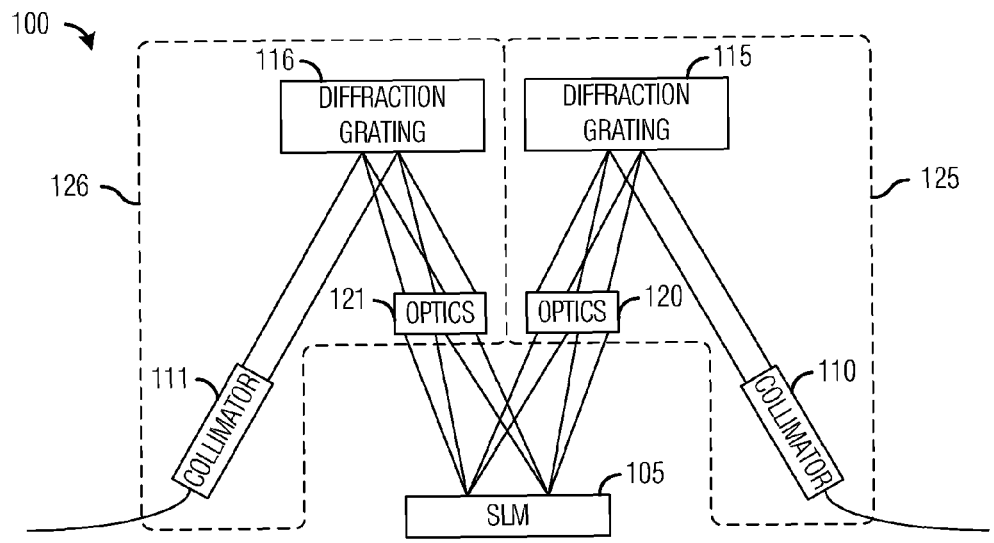
*Fig. 1a*
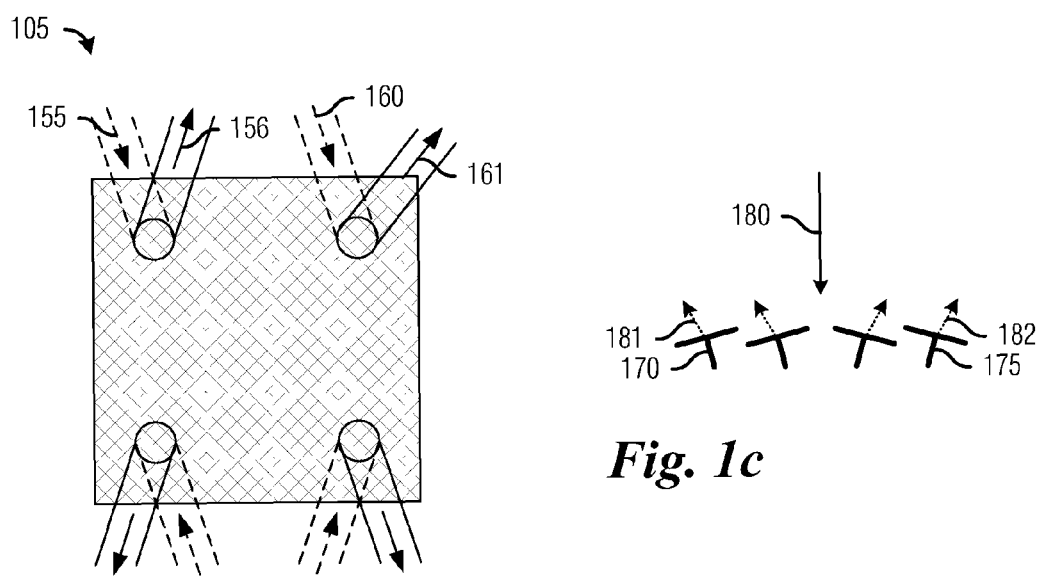
*Fig. 1b*
*Fig. 1c*

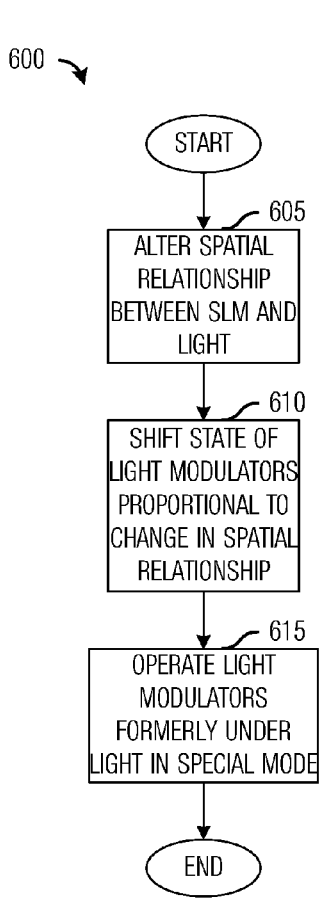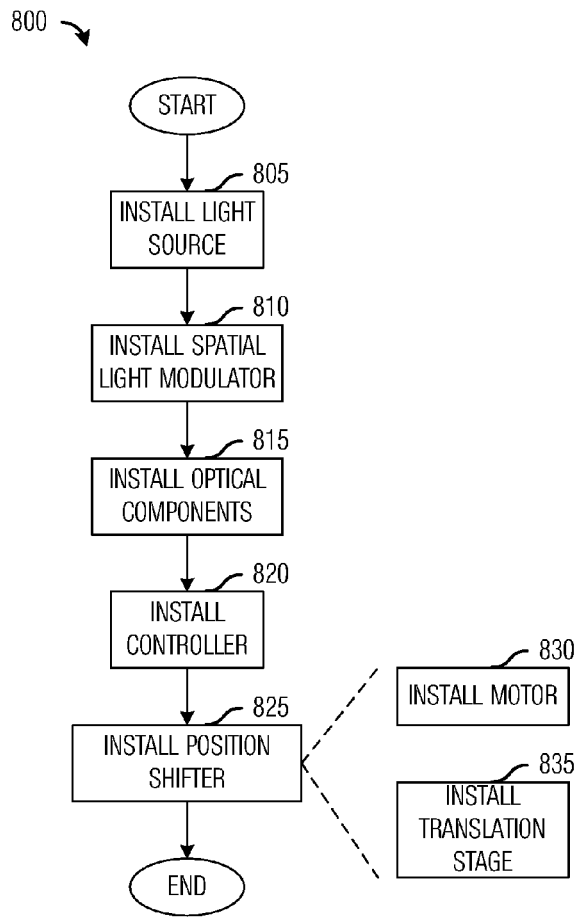
*Fig. 6*  *Fig. 8*
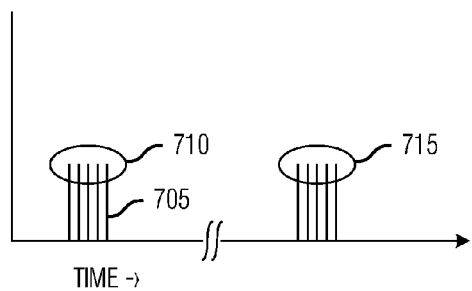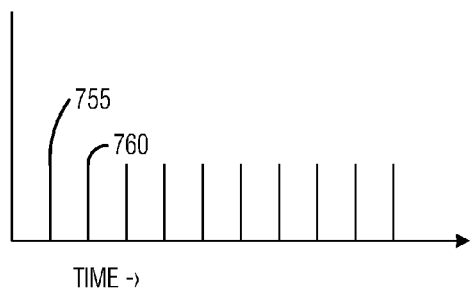
*Fig. 7a*  *Fig. 7b*

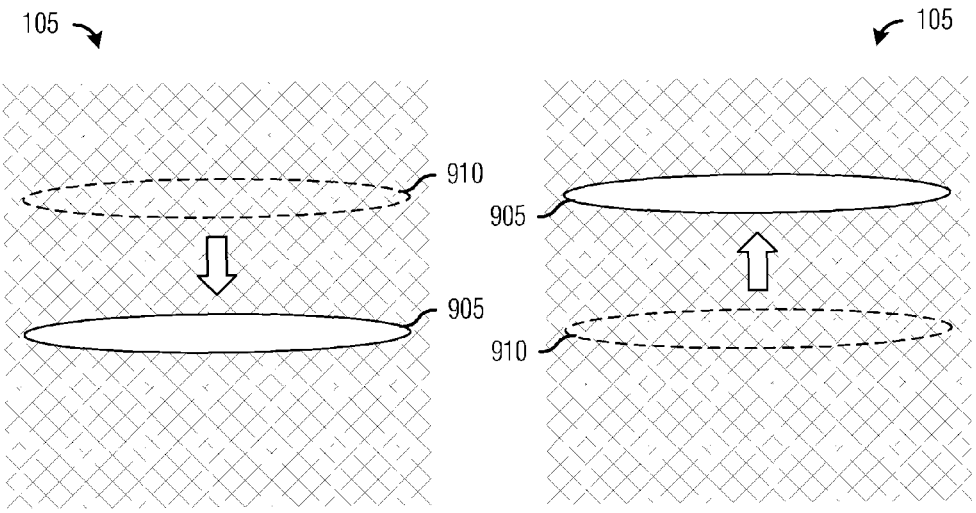
*Fig. 9a*          *Fig. 9b*
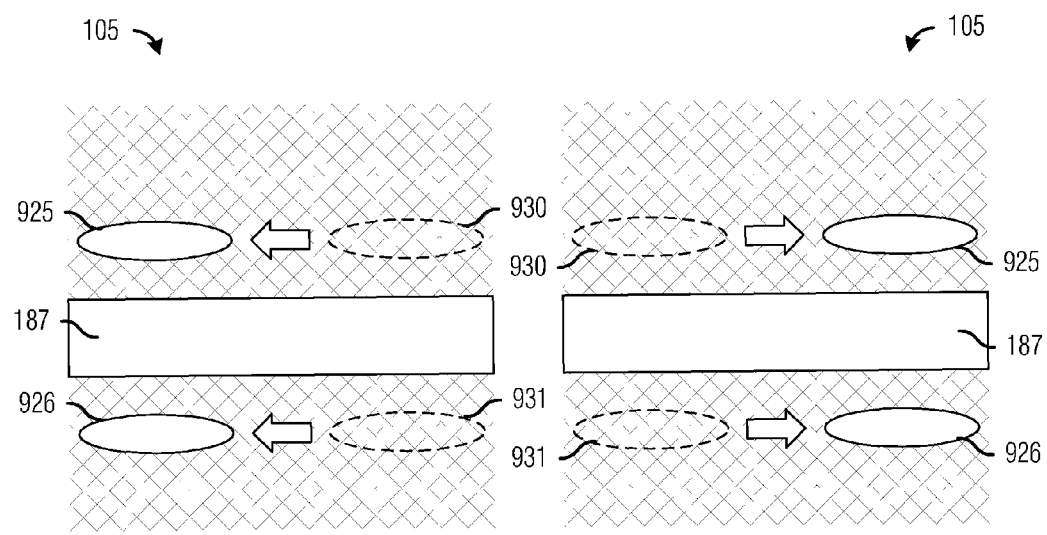
*Fig. 9c*          *Fig. 9d*

SYSTEM AND METHOD FOR OPERATING LIGHT PROCESSING ELECTRONIC DEVICES

TECHNICAL FIELD

The present invention relates generally to a system and method for light processing, and more particularly to a system and method for operating an electronic device used in light processing.

BACKGROUND

In general, spatial light modulators (SLM), such as digital micromirror devices (DMD), deformable micromirrors, liquid crystal on silicon (LCOS), ferroelectric liquid-crystal-on-silicon, reflective, transmissive, and transflective liquid crystal displays (LCD), and so forth, contain a large number of individual light modulators. SLMs have been used for creating images for use in image display systems. In addition to displaying images, these SLMs may also be used in other applications wherein there is a need to optically process light.

An example of such an application is optical networking. In optical networking, SLMs may be used for optical switching, optical signal attenuation, and so on. Light modulators in an SLM may be used to reflect or pass light to various positions to perform optical switching, while in optical signal attenuation, some light modulators in the SLM may be configured to not reflect or pass light to attenuate the optical signal. For example, if the SLM is a DMD, then micromirrors in the DMD may be pivoted to a desired position in order to switch an incoming light beam, while to attenuate an optical signal, a number of the micromirrors in the DMD may be pivoted away from an intended target to cause a loss in optical signal power, wherein the loss in optical signal power may be dependent on a pattern of the micromirrors and the number of micromirrors in the pattern pivoted away from the intended target.

In optical networking applications, it may be necessary to keep the light modulators of an SLM in a specified state for an extended period of time, sometimes on the order of months or years. Therefore, it may be possible to cause degradation, such as permanent burn-in, of the light modulators by having them maintain a single state for the extended amount of time. Furthermore, the power density of the light used in optical networking applications may be higher than that of light used in image display applications. The greater power density may lead to greater operating temperatures, which may help to further accelerate the performance degradation of the light modulators. Degradation of light modulators may not be a significant problem in image display applications since the light modulators tend to rapidly change states while displaying images and not remain in a single state for an extended period of time. In some SLM technologies, such as the DMD, the performance degradation can be reduced or eliminated by operating the pixels for a period of time in an opposite state or by cycling through states.

SUMMARY OF THE INVENTION

These and other problems are generally solved or circumvented, and technical advantages are generally achieved, by embodiments of a system and a method for operating an electronic device used in light processing.

In accordance with an embodiment, a method for operating an electronic device having a spatial light modulator (SLM), the SLM having a plurality of light modulators, is provided. The method includes altering a spatial relationship between the SLM and a light incident on the SLM, shifting light modulator states of a first portion of light modulators to a second portion of light modulators, and placing a third portion of light modulators in the SLM into a performance degradation-reducing mode. The shifting is proportional to an amount of the altering performed on the spatial relationship.

In accordance with another embodiment, an electronic device is provided. The electronic device includes a light source configured to produce light, a set of optics elements positioned in a light path of the light source after the light source, a spatial light modulator positioned in a light path of the light source after the light source and the set of optics elements, a position shifter that moves the spatial light modulator or an optics element in the set of optics elements to change a spatial relationship between the spatial light modulator and the light, and a controller electronically coupled to the spatial light modulator and to the position shifter. The set of optics elements optically manipulates the light, the spatial light modulator performs optical light processing on light incident on its surface, and the controller loads light modulator states into the spatial light modulator and changes light modulator states so that light modulator states of light modulators illuminated by the light remain substantially the same before and after the change in the spatial relationship between the spatial light modulator and the light.

In accordance with another embodiment, a method of manufacturing an electronic device is provided. The method includes installing a light source configured to generate light, installing a spatial light modulator in a light path of the electronic device after the light source, installing optical elements in the light path of the electronic device, installing a position shifter to move the spatial light modulator or an optical element, and installing a controller. The controller controls the spatial light modulator so that a first pattern of light modulator states illuminated by the light prior to a moving of the spatial light modulator or the optical element is substantially equal to a second pattern of light modulators illuminated by the light after the moving of the spatial light modulator or the optical element.

An advantage of an embodiment is that degradation of light modulators in a spatial light modulator may be prevented, thereby potentially extending the useful lifespan of a product containing the spatial light modulator.

A further advantage of an embodiment is that the performance of the product containing the spatial light modulator is not significantly impacted while preventing degradation of the light modulators.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 1a is a diagram of an optical networking device;

FIG. 1b is a diagram of a top view of a surface of an SLM;

FIG. 1c is a diagram of a side view of a DMD;

FIG. 1d is a diagram of a side view of a packaged DMD;

FIG. 1e is a diagram of a side view of a packaged DMD;

FIG. 6 is a diagram of an algorithm for use in operating an electronic device to reduce degradation of light modulators in the electronic device;

FIGS. 7a and 7b are diagrams of shifting activity versus time, showing different possible ways to reduce degradation of light modulators;

FIG. 8 is a diagram of a sequence of events in the manufacture of an electronic device; and FIGS. 9a through 9d are diagrams of a top view of an SLM showing the shifting of light incident on the surface of the SLM.

DETAILED DESCRIPTION OF ILLUSTRATIVE EMBODIMENTS

Figure 1F:
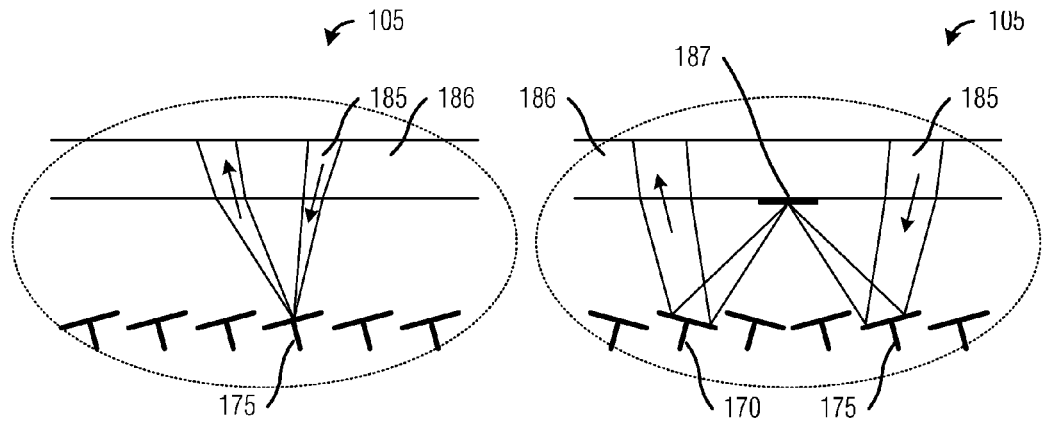
FIG. 1f is a diagram of a top view of a surface of an SLM showing individual light modulator states.
Figure 1F:
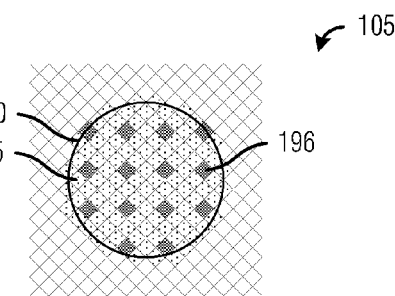

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an optical networking device utilizing a digital micromirror device (DMD) to perform optical light processing. The invention may also be applied, however, to other optical networking devices utilizing other spatial light modulators, such as deformable micromirrors, liquid crystal on silicon (LCOS), ferroelectric liquid-crystal-on-silicon, reflective, transmissive, and transflective liquid crystal displays (LCD), and so forth. Additionally, other types of micro-electrical-mechanical systems (MEMS) may be used in place of the spatial light modulators. Furthermore, the invention may also be applied to other applications wherein the entirety of a spatial light modulator's surface is not dedicated to optical light processing. Examples of such applications may include optical spectroscopy, wherein the spatial light modulator, such as a DMD, may be used as a gating element for selecting wavelengths as part of a spectrometer. The mirrors in the DMD may be used to obtain the spectral content of incoming light. Another example of an application may be in image display wherein the spatial light modulator displays an image or set of images for an extended period of time.

With reference now to FIG. 1a, there is shown a diagram illustrating an optical networking device 100. The optical networking device 100 includes a spatial light modulator (SLM) 105. The SLM 105 may be used to perform optical light processing, such as light steering, light switching, optical signal attenuation, and so forth. Examples of the SLM 105 may include DMDs, deformable micromirrors, LCOS, ferro-electric liquid-crystal-on-silicon, reflective, transmissive, and transflective liquid crystal displays (LCD), and so forth. The optical networking device 105 also includes a first light collimator 110 that may be used to make the light rays parallel, such as light rays from an optical fiber, for example, a single mode fiber.

The collimated light from the light collimator 110 may then be separated into light having different wavelengths by a first diffraction grating 115. In addition to separating the light into different wavelengths, the first diffraction grating 115 may also steer the light. Light from the first diffraction grating 115 may then be individually focused onto the surface of the SLM 105 by a set of first optics elements 120. The set of first optics elements 120 may be designed so that light of different wavelengths may focus onto different portions of the surface of the SLM 105. The set of first optics element 120 may comprise one or more optical lenses, filters, mirrors, and other optical processing components.

The light may focus on a portion of the surface of the SLM 105 having a size of roughly N×M light modulators illuminating the light modulators, where N and M are integer numbers. The light modulators illuminated by the light may be used to optically process the light, such as perform light steering, light switching, optical power attenuation, and so forth, with the states of the light modulators in the N×M light modulator sized portion of the surface of the SLM 105 being individually controlled or set to the same state.

FIG. 1b illustrates a top view of the surface of the SLM 105. As shown in FIG. 1b, four incoming light beams are reflected off the surface of the SLM 105 with the reflection depending on the state of the individual light modulators. For example, a first incoming light beam 155 may be reflected off the surface of the SLM 105 to produce a first reflected light beam 156 with a first angle, and a second incoming light beam 160 may be reflected off the surface of the SLM 105 to produce a second reflected light beam 161 with a second angle. The first angle may be different from the second angle.

Turning back now to FIG. 1a, light reflecting from the surface of the SLM 105 may then receive additional processing by a set of second optical elements 121. The set of second optical elements 121 may refocus the light reflected from the surface of the SLM 105 onto a second diffraction grating 116, for example. The second diffraction grating 116 may recombine the individual wavelengths of light back into a parallelized beam of light and redirect the parallelized beam of light onto the second light collimator 111. The second light collimator 111 may focus the light into an output optical fiber.

Collectively, the first light collimator 110, the first diffraction grating 115, and the set of first optical elements 120 may be referred to as injection optics 125 since they may be used for injecting incoming light onto the surface of the SLM 105. Similarly, the set of second optical elements 121, the second diffraction grating 116, and the second light collimator 111 may be referred to as collection optics 126 since they may be used to collect light reflected off the surface of the SLM 105. Although shown in FIG. 1a as different sets of optical elements, the injection optics 125 and the collection optics 126 may also be implemented as a single set of optical elements.

FIG. 1c illustrates a detailed view of a portion of the surface of the SLM 105, wherein the SLM 105 is a DMD. As shown in FIG. 1c, the micromirrors of a DMD may function in binary operation mode and each micromirror may pivot to one of two positions depending on the state of a memory cell associated with the micromirror. For example, micromirror 170 may be in a first position, such as −15 degrees, for example, and micromirror 175 may be in a second position, such as +15 degrees, for example. The values of −15 degrees and +15 degrees are only exemplary values for discussion purposes and actual angles may vary. Furthermore, a DMD may function in analog operation mode, wherein micromirrors in the DMD may pivot to many positions in response to a number of signal magnitudes and electrostatic potentials. An incoming beam of light 180 having an incoming angle of zero degrees may then reflect off a reflective surface of the micromirrors in the DMD. The incoming beam of light 180 reflecting off the surface of micromirror 170 is shown as light beam 181 and may be at −30 degrees while the incoming beam of light 180 reflecting off the surface of micromirror 175 is shown as light beam 182 and may be at +30 degrees, for example.

FIG. 1d illustrates a side view of a portion of a packaged SLM 105, wherein the SLM 105 is a DMD. As shown in FIG. 1d, the micromirrors of a DMD may be in binary operation mode and each micromirror may pivot to one of two positions depending on the state of a memory cell associated with the micromirror. The micromirrors shown, such as the micromirror 175, are pivoted to one position. A light beam 185 passes through an optically transparent top 186 of the DMD and reflects off the micromirrors. After reflecting off the micromirrors, the light beam 185 once again passes through the optically transparent top 186 as it exits the DMD.

FIG. 1e a side view of a portion of a packaged SLM 105, wherein the SLM 105 is a DMD. As shown in FIG. 1e, the micromirrors of a DMD may be in binary operation mode and each micromirror may pivot to one of two positions depending on the state of a memory cell associated with the micromirror. Some of the micromirrors shown, such as the micromirror 170, are pivoted to a first position, while some of the micromirrors, such as the micromirror 175, are pivoted to a second position. A light beam 185 passes through the optically transparent top 186 of the DMD and reflects off the micromirror 175. The micromirror 175 may be positioned so that the light beam 185 reflects off a reflective stripe 187 rather than passing through the optically transparent top 186 and exiting the DMD. The light beam 185 reflects off the reflective stripe 187 onto additional micromirrors, such as the micromirror 170. The light beam 185 then reflects off the micromirror 170 and then passes through the optically transparent top 186, exiting the DMD.

FIG. 1f illustrates a top view of a portion of the surface of the SLM 105. FIG. 1f illustrates a circle 190 that may be representative of a light beam incident on the surface of the SLM 105. The circle 190 covers an area roughly the size of 12×12 light modulators. Some of the light modulators, such as light modulator 195, may be in a state to reflect the light beam 190 to a desired position, such as toward the set of second optics elements 121, while some of the light modulators, such as light modulator 196, may be in a state to reflect the light beam 190 away from the desired position. The light modulators reflecting light away from the desired position, such as the light modulator 196, may be used to attenuate the optical signal power of the light beam 190. The greater the number of light modulators in a state like the light modulator 196, the lower the optical signal power of the light beam 190 reaching the set of second optics elements 121, for example.

Although shown in FIGS. 1a, 1b, 1c, and 1d to be reflective in nature, the SLM 105 may also be transmissive, wherein the light modulators in the SLM 105 may pass light or block light depending on their state. Therefore, the discussion of reflective SLMs in general, and DMDs in particular, should not be construed as being limiting to either the scope or the spirit of the embodiments.

Data transmitted over an optical network may require that the optical network not change for an extended period of time. Once configured, the optical network may not change over periods as long as months or years. Keeping light modulators of an SLM in a fixed state for an extended period of time and usually with high operating temperatures may result in degradation of light modulators in the SLM. For example, continuous use at elevated temperatures may degrade the material used in liquid crystal displays. Additionally, mechanical structures used in MEMS may be susceptible to performance degradation at high operating temperatures. To further complicate matters, the operation of the optical network is generally continuous with little to no down time that may be used to help prevent or reverse degraded performance of the light modulators in the SLM.

Figure 2:
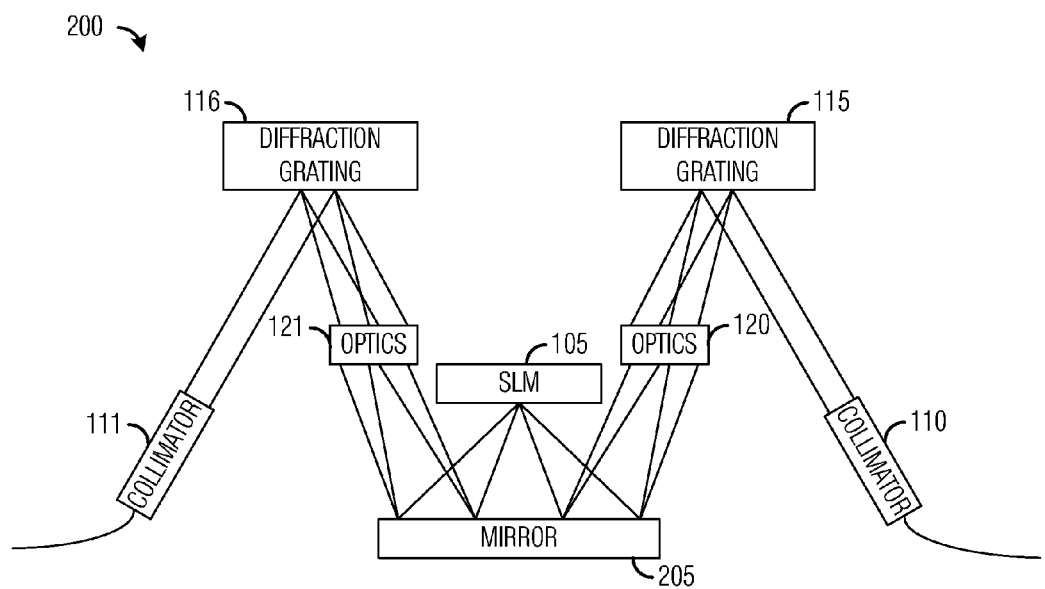
FIG. 2 is a diagram of an optical networking device.

FIG. 2 illustrates an optical networking device 200. Like the optical network device 100 (FIG. 1a), the optical networking device 200 uses the SLM 105 to perform optical light processing. However, the optical networking device 200 uses a mirror 205 to reflect light towards and away from the SLM 105. A fold mirror may be an example of a type of mirror that may be used to implement the mirror 205. A potential advantage of the use of the mirror 205 may be a reduction in the physical size of the optical network device 200, since the mirror 205 allows the light to traverse a necessary optical distance to achieve desired optical performance while reducing the physical distance traveled by the light.

Since keeping light modulators in the SLM 105 in a fixed state for an extended amount of time at elevated operating temperatures may lead to degraded light modulators, one possible technique to help prevent degradation of the light modulators is to change the light modulators used to perform optical light processing over time. By doing this, the light modulators may not be used for extended periods of time. However, since an optical network tends to be in continuous operation, it may be difficult to change the light modulators used to perform optical light processing without negatively impacting the performance of the optical network.

Figure 3A:
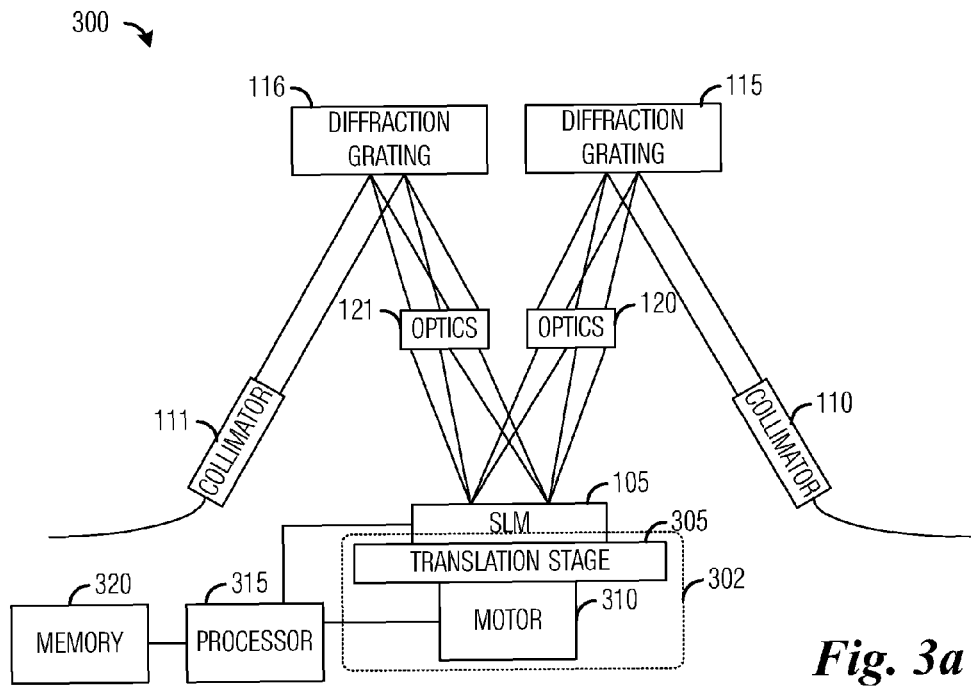
FIG. 3a is a diagram of an optical networking device including a position shifter for reducing degradation of light modulators.

FIG. 3a illustrates an optical networking device 300, wherein the optical networking device 300 includes a position shifter 302 for reducing degradation of light modulators due to overuse. One method to change the light modulators used to perform optical light processing in an SLM may be to physically move the SLM containing the light modulators. As with the optical networking device 100 discussed previously, the optical networking device 300 includes the SLM 105 that may be used to perform optical light processing. The optical networking device 300 also includes a first light collimator 110 that may be used to parallelize light, the first diffraction grating 115 that may be used to separate light into different wavelengths, the set of first optics elements 120 that may be used to focus light onto the surface of the SLM 105, the set of second optics elements 121 that may be used to refocus light reflected from the surface of the SLM 105 onto the second diffraction grating 116, and a second light collimator 111 that may be used to focus light from the second diffraction grating 116 into an output optical fiber.

The position shifter 302 may operate by moving the SLM 105. The position shifter 302 includes a translation stage 305 that may be used to move the SLM 105. The translation stage 305 may be a movable surface coupled to a motor(s) 310. The motor 310 may be able to move the translation stage 305 along one or two axes forming a plane. Preferably, the translation stage 305 may move the SLM 105 in such a manner that it remains in the same plane as the surface of the SLM 105. This may prevent the need to adjust the focus of the set of first optics elements 120 and the set of second optics elements 121 as the translation stage 305 moves the SLM 105.

As the motor 310 moves the translation stage 305 (and hence the SLM 105) along one or two axes describing the plane, it may be necessary to change the state of the light modulators in the SLM 105 so that effectively the light being optically processed encounters substantially the same configuration of light modulators as the SLM 105 is moved underneath the light. This may be achieved by a processor 315 coupled to the SLM 105 and to the motor 310. The processor 315 may change the states of the light modulators moving into the light in a manner consistent with the light modulators moving from under the light, i.e., light modulator states of the light modulators illuminated by the light remain substantially consistent before and after the SLM 105 is moved. For example, a pattern of light modulator states illuminated by the light prior to the move will remain substantially equal to a pattern of light modulator states illuminated by the light after the move. A controller, an application specific integrated circuit, a state machine, and so forth, may be used in place of the processor 315. For example, if the SLM 105 is being moved from left to right, then the processor 315 may change the states of the light modulators on a left edge of the light to correspond to the state of the light modulators on a right edge of the light. A memory 320 may be used to store the state of the light modulators in the SLM 105.

Figure 3B:
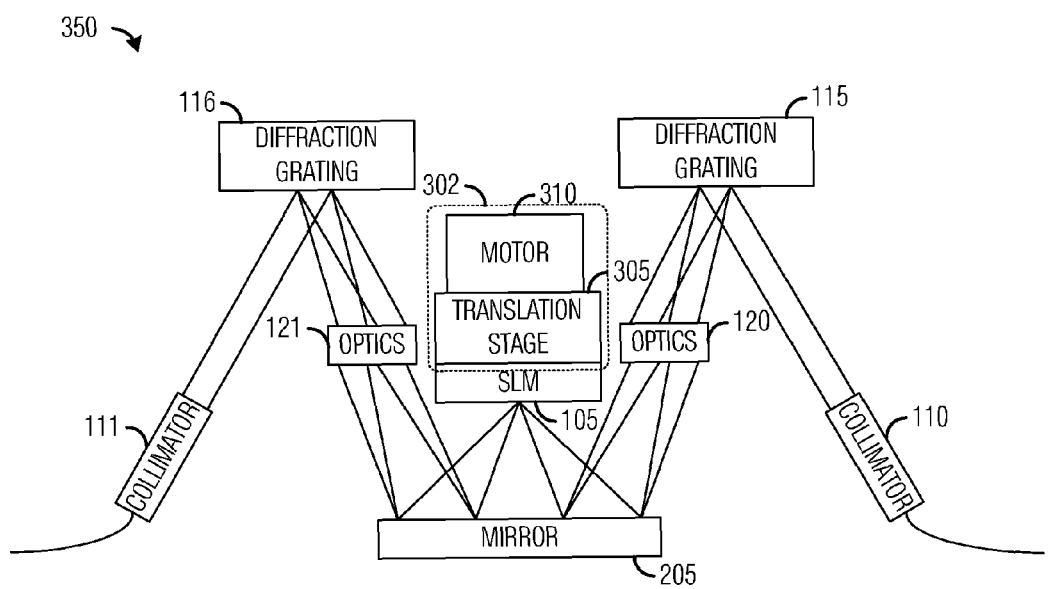
FIG. 3b is a diagram of an optical networking device including a position shifter for reducing degradation of light modulators.

FIG. 3b illustrates an optical networking device 350, wherein the optical networking device 350 includes a system for reducing degradation of light modulators due to overuse. The optical networking device 350 may be similar to the optical network device 200 with the inclusion of the translation stage 305 and the motor 310. Like the optical networking device 300, the optical networking device 350 includes the processor 315 and the memory 320, but they are omitted in the diagram to maintain simplicity.

Figure 4A:
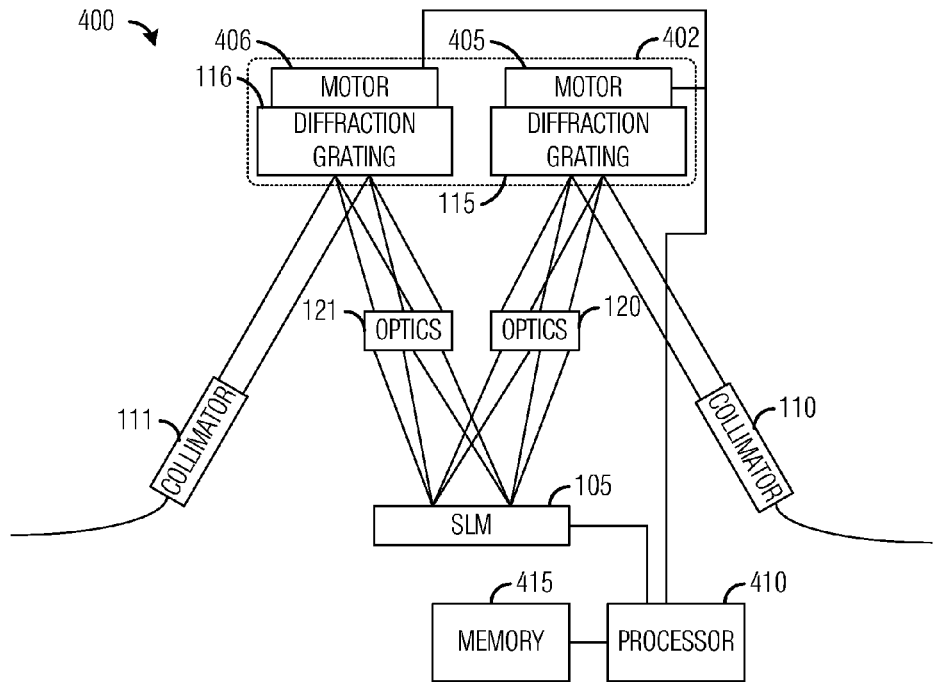
FIG. 4a is a diagram of an optical networking device including a position shifter for reducing degradation of light modulators.

FIG. 4a illustrates an optical networking device 400, wherein the optical networking device 400 includes a position shifter 402 for reducing degradation of light modulators due to overuse. Another method to substitute the light modulators used to perform optical light processing may be to change the position of the light being processed on the surface of an SLM, such as the SLM 105. It may be possible to change the position of the light by adjusting the optical components of the optical networking device 400. The optical components of the optical networking device 400 includes a first light collimator 110 that may be used to parallelize light, the first diffraction grating 115 that may be used to separate light into different wavelengths, the set of first optics elements 120 that may be used to focus light onto the surface of the SLM 105, the set of second optics elements 121 that may be used to refocus light reflected from the surface of the SLM 105 onto the second diffraction grating 116, and a second light collimator 111 that may be used to focus the light onto an output optical fiber.

In cases such as shown in FIG. 4a, wherein there are separate optics for an incoming light and an outgoing light, both the incoming light and the outgoing light may be turned, rotated, shifted, or a combination thereof. While it may be possible to change the position of the light on the surface of the SLM 105 by turning, rotating, shifting, or a combination thereof the first diffraction grating 115 and the second diffraction grating 116 and/or the set of first optical elements 120 and the set of second optical elements 121, it may be preferred that the manipulation be limited to the first diffraction grating 115 and the second diffraction grating 116. Since the set of first optics elements 120 and the set of second optics elements 121 may contain multiple optical elements that are positioned with strict tolerances on position, orientation, and so forth, manipulation of some or all of the optical elements in the set of first optics elements 120 and the set of second optics elements 121 may result in a degradation of the performance of the optical networking device 400. However, if the performance of the set of first optics elements 120 and the set of second optics elements 121 may be maintained after any turning, rotating, shifting, or a combination thereof, then the set of first optics elements 120 and the set of second optics elements 121 may also be used in the changing of the position of the light on the surface of the SLM 105.

The position shifter 402 may turn, rotate, shift, or a combination thereof, the first diffraction grating 115 and the second diffraction grating 116 (and/or the set of first optics elements 120 and the set of second optics elements 121) through the use of a motor 405 coupled to the first diffraction grating 115 and a motor 406 coupled to the second diffraction grating 116. The motor 405 may turn, rotate, shift, or a combination thereof, the first diffraction grating 115 in such a manner that a spatial relationship between the first diffraction grating 115 and the set of first optics elements 120 is maintained. Similarly, the motor 406 may turn, rotate, shift, or a combination thereof, the second diffraction grating 116 in such a manner that a spatial relationship between the second diffraction grating 116 and the set of second optics elements 121 is maintained. By maintaining the spatial relationship between the first diffraction grating 115 and the set of first optics elements 120 and the second diffraction grating 116 and the set of second optics elements 121, it may alleviate any need to make adjustments to the optical elements in the set of first optics elements 120 and the set of second optics elements 121, such as adjusting the focus of the set of first optics elements 120 or the set of second optics elements 121.

It may be possible to couple the first diffraction grating 115 and the second diffraction grating 116 together so that a single motor may be used to turn, rotate, shift, or a combination thereof, both diffraction gratings. Additionally, it may also be possible to use a single diffraction grating and a single set of optics elements for both the incoming light and the outgoing light. In such a configuration, a motor may need to only turn, rotate, shift, or a combination thereof, a single diffraction grating and/or a single set of optics elements. An example of such a configuration may be a system that uses a single diffraction grating and focusing optics that overlaps the input light and the outgoing light so that the outgoing light enters the same optical fiber that it arrived in. Another example of such a configuration may be a system wherein the incoming light and the outgoing light are slightly offset so that the outgoing light enters an optical fiber slightly offset from the incoming light. The optical fiber in this configuration may be an array of closely spaced optical fibers.

As the position of the light on the surface of the SLM 105 is changed, it may be necessary to change the state of light modulators in the SLM 105 so that effectively the light being optically processed encounters substantially the same configuration of light modulators as the light moves across the surface of the SLM 105. This may be achieved by a processor 410 coupled to the SLM 105 and to the motor 405 and the motor 406. The processor 410 may change the states of the light modulators moving into the light in a manner consistent with the light modulators moving from under the light as the position of the light on the surface of the SLM 105 changes. A memory 415 may be used to store the state of the light modulators in the SLM 105.

Figure 4B:
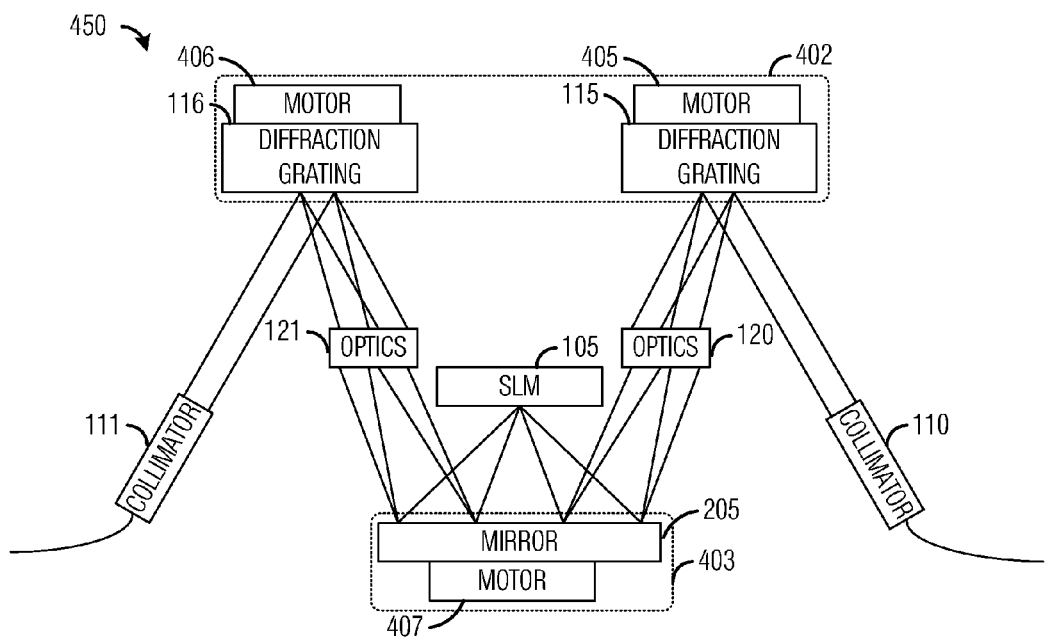
FIG. 4b is a diagram of an optical networking device including a position shifter for reducing degradation of light modulators.

FIG. 4b illustrates an optical networking device 450, wherein the optical networking device 450 includes a system for reducing degradation of light modulators due to overuse. The optical networking device 450 may be similar to the optical networking device 200 with the inclusion of multiple position shifters. The optical networking device 450 includes two position shifters, a position shifter 402 to alter the position of the first diffraction grating 115 and the second diffraction grating 116 and a position shifter 403 to alter the position of the mirror 205 using a motor 407. Like the optical networking device 400, the optical networking device 450 includes the processor 410 and the memory 415, but they are omitted in the diagram to maintain simplicity.

In addition to moving/shifting/turning/rotating the SLM 105 as shown in FIGS. 3a and 3b and moving/shifting/turning/rotating optical components as shown in FIGS. 4a and 4b, it may be possible to combine both the moving/shifting/turning/rotating of the SLM 105 and the moving/shifting/turning/rotating of optical components to periodically replace the light modulators used to perform optical light processing. By combining both techniques, it may be possible to effectively move the position of the light beam on the surface of the SLM 105 by a greater amount. Additionally, if the moving/shifting/turning/rotating of the SLM 105 or an optical component may occur in only a single axis (to simplify design and implementation, for example), then combining the moving/shifting/turning/rotating of both the SLM 105 and the optical components may enable the effective moving of the position of the light beam on the surface of the SLM 105 along two axes.

Figure 5A:
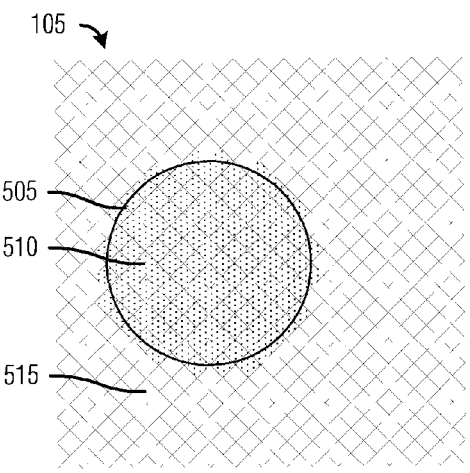
FIGS. 5a through 5c are diagrams of a top view of an SLM showing the shifting of a light incident on the surface of the SLM.

FIG. 5a illustrates a view of a surface of a portion of an SLM, such as the SLM 105, that is part of an optical networking device. The diagram shown in FIG. 5a illustrates a light beam incident on the surface of the SLM 105 with the position of the light beam on the surface of the SLM 105 shown as circle 505. Light modulators, such as light modulator 510, in the circle 505 may be illuminated by the light beam and may be configured to modulate light from the light beam in a manner consistent with proper operation of the optical networking device. Other light modulators, such as light modulator 515, outside of the circle 505 may be in a rest state or a don't care state if they are not being used to modulate light.

Figure 5B:
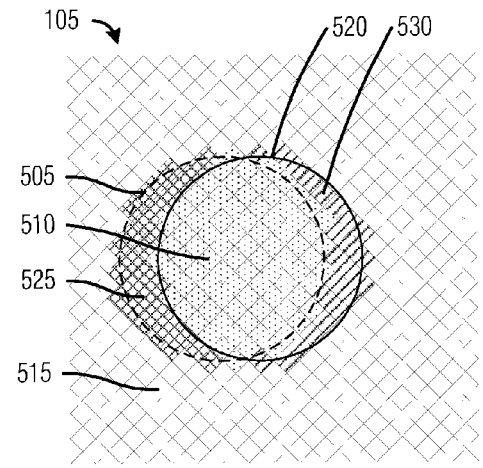

FIG. 5b illustrates a view of a surface of a portion of the SLM 105, wherein the position of the light beam has been changed. As shown in FIG. 5b, the light beam has been shifted or translated to the right, with the position of the light beam on the surface of the SLM 105 shown as circle 520. The amount of the shift is about two light modulators to the right or about 20% of the total number of light modulators is changed. The change in the position of the light beam may be as a result of a shifting of the SLM 105, a shifting of an optical component, or a combination of both. Since the change in position of the light beam is small (significantly less than the size of the light beam), the state of a majority of the light modulators 510 do not need to change. Light modulators that were in the circle 505 but not in the circle 520, such as light modulator 525, may be placed into a special mode to reduce, prevent, or reverse any performance degradation that may have arisen from extended use. The special mode may involve periodic switches in light modulator state, rapid light modulator state switching, switching to a state that is complementary to the state of the light modulator 510, or so forth. Since these light modulators, such as the light modulator 525, are no longer illuminated by the light beam, their states may be changed without impacting the performance of the optical networking device. Light modulators that are in the circle 520 but were not in the circle 505, such as light modulator 530, may be switched to a state consistent with proper operation of the optical networking device.

Figure 5C:
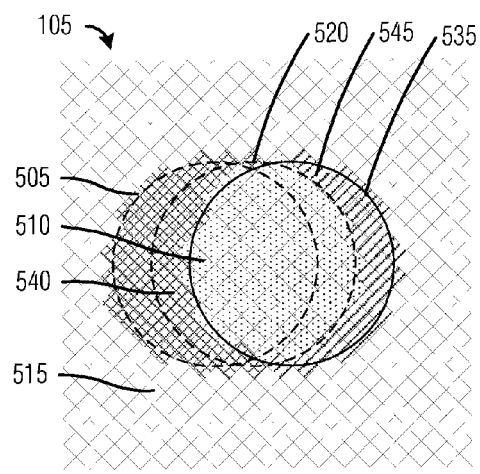

FIG. 5c illustrates a view of a surface of a portion of the SLM 105, wherein the position of the light has been changed. As shown in FIG. 5b, the light beam has been shifted to the right, with the position of the light beam on the surface of the SLM 105 shown as circle 535. Light modulators that were in the circle 520 but not in the circle 535, such as light modulator 540, may be placed into a special mode to prevent or reverse any performance degradation that may have arisen from extended use. Again, since these light modulators, such as the light modulator 525, are no longer illuminated by the light beam, their states may be changed without impacting the performance of the optical networking device. Light modulators that are in the circle 535 but were not in the circle 520, such as light modulator 545, may be switched to a state consistent with proper operation of the optical networking device. The shift may be continued until all light modulators originally in the circle 505 are no longer illuminated by the light beam. After a period of time, the light beam may be shifted back to positions on the surface of the SLM 105 shown as circles 505, 520, 535, and so on.

Figure 5D:
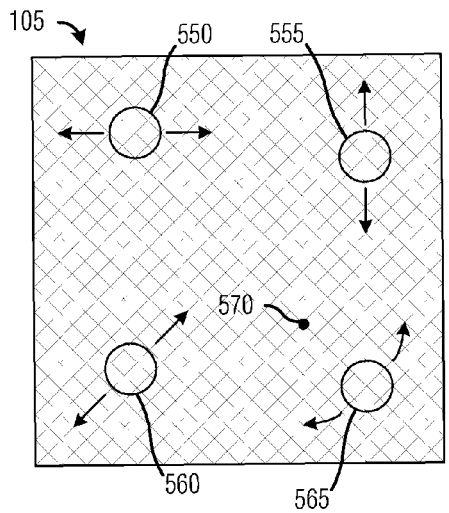
FIG. 5d is a diagram of a top view of an SLM showing several possible shifts of a light incident on the surface of the SLM.

FIG. 5d illustrates a view of a surface of a portion of the SLM 105, wherein light from multiple light beams are shining on the surface of the SLM 105. The diagram shown in FIG. 5d illustrates several ways to alter the position of light on the surface of the SLM 105. Light from a first light beam, shown as circle 550, may be shifted along a horizontal axis, while light from a second light beam, shown as circle 555, may be shifted along a vertical axis. In addition to altering the position of light on the surface of the SLM 105 along a single axis, it may be possible to alter the position of light along two axes. Light from a third beam of light, shown as circle 560, may be shifted along both a vertical axis and a horizontal axis. If the shifts are performed equally along the two axes, then the shift in the position of light will be along a 45 degree diagonal. By varying the amount of shifting performed along the two axes, it may be possible to perform radial shifts. Light from a fourth beam of light, shown as circle 565, may be shifted radially about a point 570.

In addition to the four regular shifts in the position of light on the surface of the SLM 105, random shift patterns may also be used. In general, any form of shifting in the position of light on the surface of the SLM 105 may be acceptable as long as the shifting results in a cycling in the light modulators used to perform optical light processing. The four different shifts in the position of light on the surface of the SLM 105 are illustrated together for discussion purposes. Typically, a single type of shift may be performed for all light on a single SLM surface.

FIG. 6 illustrates an algorithm 600 for use in the reduction of performance degradation to light modulators due to overuse. The algorithm 600 may execute in a processor, such as the processor 315, the processor 410, a controller, an application specific integrated circuit, a controller, or so on. The reduction of performance degradation to light modulators due to overuse may begin with an altering a spatial relationship between an SLM and a light beam(s) incident on the surface of the SLM (block 605). Altering the spatial relationship between the SLM and the light beam(s) may be accomplished by moving the SLM and/or the light beam(s). This may be achieved by moving the SLM, the light beams, or both.

The SLM may be moved through the use of a translation stage, such as the translation stage 305, coupled between the SLM and a motor, such as the motor 310, as shown in FIG. 3a and FIG. 3b, for example. The motor 310 may move the translation stage 305 (and hence, the SLM) along one or two axes describing a plane that may be an extension of the surface of the SLM. The light beams may be moved by manipulating optical components, such as the first diffraction grating 115, the set of first optics elements 120, and the mirror 205, as shown in FIGS. 4a and 4b. The optical components may be moved by a motor, such as the motor 405 and the motor 406. The motors 405 and 406 may alter the spatial relationship between the SLM and the light beam(s) by shifting, rotating, turning, and combinations thereof, the optical components. It may be possible to combine both the moving of the SLM and the light beam(s) to alter the spatial relationship between the SLM and the light beam(s).

Preferably, the altering of the spatial relationship between the SLM and the light beam(s) should occur in small increments so that the performance of the optical light processing may not be negatively impacted. For example, if the altering of the spatial relationship between the SLM and the light beam(s) involves a shift large enough so that the optical light processing must temporarily stop, then communications in an optical network utilizing the SLM may need to be paused. Therefore, small shifts that affect 2% to 5% of the light modulators may be preferred. For performance critical applications, smaller shifts that affect less than about 1% to 2% of the light modulators may be preferred. However, in less sensitive applications, larger shifts resulting in less than 15% to 20% of the light modulators being affected may be permissible. In terms of actual light modulators in the SLM, in performance critical applications, shifts of one light modulator at a time may be performed, while for less critical applications, shifts of multiple light modulators at a time may be possible.

Additionally, the altering of the spatial relationship between the SLM and the light beam(s) may occur in rapid succession separated by an extended period without any activity or they may occur with regularity. FIG. 7a illustrates a plot of shifting activity versus time. A single impulse, such as impulse 705, illustrates a single instance where the spatial relationship between the SLM and the light beam(s) is altered. As discussed previously, the altering of the spatial relationship should occur in relatively small increments so that the performance may not be negatively impacted. For discussion purposes, let a single instance of altering of the spatial relationship between the SLM and the light beam(s) result in about 20% of the light modulators being impacted. Therefore, five successive instances of altering of the spatial relationship may result in the replacement of the light modulators previously used to perform optical light processing. A first grouping 710 highlights five consecutive instances of altering of the spatial relation, with each instance occurring at least as rapidly as possible without negatively impacting the performance of the optical light processing. The amount of time between impulses in the first grouping may be about equal or different. FIG. 7a also illustrates a second grouping 715 occurring at a substantially later time. The second grouping 715 may continue to shift the light or the SLM further in the same direction as the first grouping 710 or may shift it back in the opposite direction (or along other possible directions).

FIG. 7b illustrates a plot of shifting activity versus time. FIG. 7b displays a sequence of impulses, such as impulse 755 and impulse 760, with each impulse representing a single instance where the spatial relationship between the SLM and the light beam(s) is altered. The impulses in the sequence of impulses may be separated by substantially equal periods of time or the separation between individual impulses may differ. Furthermore, the amount of change in the spatial relationship between the SLM and the light beam(s) may be about equal for each change in the spatial relation or the amount of change may differ for each change in spatial relationship.

Turning back to FIG. 6, prior to, during, or after the altering of the spatial relationship between the SLM and the light beam(s), the state of the light modulators being used to perform optical processing on the light beam(s) may be shifted an amount proportional to the altering of the spatial relationship between the SLM and the light beam(s) (block 610). The shifting of the state of the light modulators may help to ensure that, as the spatial relationship between the SLM and the light beam(s) is altered, the light processing performed by the light modulators is not significantly impacted by the shifting of the SLM, the light beam(s), or both. The shifting of the state of the light modulators may ensure that light modulators illuminated by the light beam(s) after the altering of the spatial relationship between the SLM and the light beam(s) are in substantially the same state as light modulators illuminated by the light beam(s) prior to the altering of the spatial relationship.

The shifting of the state of the light modulators may depend on how the spatial relationship between the SLM and the light beam(s) is being altered. For example, if only the SLM is being shifted, then the shifting of the state of the light modulators may be in a direction substantially opposite to the shifting of the SLM. If only the light beam(s) is being shifted, then the shifting of the state of the light modulators may be in a direction substantially equal to the shifting of the light beam(s). If both the SLM and the light beam(s) are being shifted, then the shifting of the state of the light modulators may depend on a net result of the shifting of the SLM and the light beam(s).

After the shifting of the state of the light modulators (block 610), the light modulators formerly being used to perform optical light processing may be operated in a special operating mode to help prevent or reverse performance degradation arising from overuse (block 615). For example, if the SLM is a DMD, then the light modulators may be set to a state opposite their previous state and held in the new state for a period of time about equal to the amount of time that they were used to optically process the light beam(s). Alternatively, the light modulators may be set to alternate states with the light modulators holding the state for a specified period of time. In yet another alternative, the light modulators may be exercised by cycling through a sequence of states, wherein the sequence of states may be a predetermined sequence, a random sequence of states, a pseudorandom sequence of states, or so forth.

FIG. 8 is a diagram illustrating a sequence of events 800 in the manufacture of an electronic device using an SLM for optical light processing. The manufacture of the electronic device may begin with installing a light source, which may be an optical fiber carrying data in optical form or a light source capable of producing light (block 805). The manufacture may continue with installing an SLM, such as a DMD, in the light path of the light source (block 810). After installing the SLM, optical components may be installed in the light path, between the light source and the SLM (block 815). The optical components may also be installed after the SLM. Optical components may include optics elements such as lenses, filters, and so forth, and diffraction gratings. A controller or processor for the electronic device may then be installed (block 820).

With the controller installed, the manufacture may continue with installing a position shifter (block 825). The installing of the position shifter may include the installing of a motor (block 830) to enable the moving, shifting, rotating, turning, or a combination thereof, of the SLM, one or more of the optical components, or both the SLM and one or more of the optical components. If the motor is installed to move, shift, rotate, turn, and so forth, the SLM, a translation stage may also be installed (block 835). The order of the events in this sequence may be changed, the sequence may be performed in a different order, or some of the steps may be performed at the same time to meet particular manufacturing requirements of the various embodiments of the display plane, for example.

FIGS. 9a and 9b are views of a surface of a portion of the SLM 105. In optical networking, it may be possible to use an elongated beam of light in place of a circle of light as shown previously. FIG. 9a illustrates an elongated beam of light incident on the surface of the SLM 105 with the position of the elongated beam of light on the surface of the SLM 105 shown as an oval 905. The oval 905 had previously been at a position represented as a dashed oval 910 prior to a shift of either the elongated beam of light or the SLM 105 or both. FIG. 9b illustrates a shift of the elongated beam of light or the SLM 105 or both in a complementary direction. Generally, depending on application, a wide variety of different shapes of light may be used in optical networking. Therefore, the discussion of circles, elongated beams, ovals, and so forth, should not be construed as being limiting to either the scope or the spirit of the embodiments.

FIGS. 9c and 9d are views of a surface of a portion of the SLM 105, wherein a reflective stripe 187 is shown superimposed on the surface of the SLM 105. The presence of the reflective stripe 187 may restrict permissible shifts in a light or the SLM 105 or both, since a shift that may result in the light missing the reflective stripe 187 may lead to undesirable results.

FIGS. 9c and 9d illustrate ovals, such as oval 925 and oval 926, representing elongated beams of light after a shift of the elongated beams of light or the SLM 105 or both. Ovals, such as oval 930 and oval 931, represent the elongated beams of light prior to the shift. A shift along the reflective stripe 187 may help to ensure that the light does not miss the reflective stripe 187.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating an electronic device having a spatial light modulator (SLM), the SLM having a plurality of light modulators, the method comprising:

altering a spatial relationship between the SLM and a light incident on the SLM, wherein the light incident on the SLM arrives at the SLM through an injection optic and is collected by a collection optic, and wherein the altering the spatial relationship between the SLM and the light incident on the SLM comprises shifting the injection optic and the collection optic;

shifting light modulator states of a first portion of light modulators to a second portion of light modulators, wherein the shifting is proportional to an amount of the altering performed on the spatial relationship; and placing a third portion of light modulators in the SLM into a performance degradation-reducing mode in which the degradation of the performance of the third portion of light modulators in the SLM is reduced.

2. The method of claim 1, wherein the altering the spatial relationship between the SLM and the light incident on the spatial light modulator comprises shifting the SLM.

3. The method of claim 2, wherein shifting the SLM comprises moving the SLM in a plane substantially parallel to a surface of the SLM containing the plurality of light modulators.

4. The method of claim 3, wherein the moving the SLM in the plane comprises moving the SLM along one or two axes describing the plane.

5. The method of claim 1, wherein the shifting the injection optic and the collection optic comprises moving, shifting, turning, rotating, or combinations thereof, the injection optic and the collection optic.

6. The method of claim 5, wherein the shifting the injection optic and the collection optic occurs in a plane parallel to a surface of the SLM containing the plurality of light modulators.

7. The method of claim 1, wherein the first portion of light modulators comprises light modulators illuminated by the light prior to the altering the spatial relationship and the second portion of light modulators comprises light modulators illuminated by the light after the altering the spatial relationship.

8. The method of claim 7, further comprising repeating the altering, the shifting, and the placing in response to a determining that the second portion of light modulators includes light modulators in the first portion of light modulators.

9. The method of claim 8, further comprising prior to the repeating the altering, the shifting, and the placing, waiting a specified period of time.

10. The method of claim 1, wherein the third portion of light modulators comprises light modulators illuminated by the light prior to the altering the spatial relationship but not illuminated by the light after the altering the spatial relationship.

11. The method of claim 10, wherein the third portion of light modulators comprises a range of about less than one (1) percent to about 20 percent of the first portion of light modulators.

12. The method of claim 1, wherein the placing the third portion of light modulators is selected from the group consisting of:

setting the third portion of light modulators to states different from their corresponding states prior to the altering the spatial relationship, setting the third portion of light modulators to states corresponding to a random sequence of states, setting the third portion of light modulators to states corresponding to a pseudorandom sequence of states, setting the third portion of light modulators to states corresponding to a specified sequence of states, and combinations thereof.

\* \* \* \* \*